United States Patent
Mitra et al.

(10) Patent No.: US 11,544,636 B2
(45) Date of Patent: Jan. 3, 2023

(54) RIDE-SHARE ACCESSIBILITY

(71) Applicant: Ford Global Technologies, LLC, Dearborn, MI (US)

(72) Inventors: Pramita Mitra, West Bloomfield, MI (US); Pietro Buttolo, Dearborn Heights, MI (US); Basavaraj Tonshal, Northville, MI (US); Qianyi Wang, Allen Park, MI (US); Gary Steven Strumolo, Canton, MI (US); Kelly Lee Zechel, Plymouth, MI (US); Brian Nash, Northville, MI (US); Theodore Wingrove, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 16/634,372

(22) PCT Filed: Jul. 31, 2017

(86) PCT No.: PCT/US2017/044590
§ 371 (c)(1),
(2) Date: Jan. 27, 2020

(87) PCT Pub. No.: WO2019/027408
PCT Pub. Date: Feb. 7, 2019

(65) Prior Publication Data
US 2021/0117871 A1    Apr. 22, 2021

(51) Int. Cl.
*G06Q 10/02* (2012.01)
*H04W 4/40* (2018.01)
(Continued)

(52) U.S. Cl.
CPC ............... *G06Q 10/02* (2013.01); *A61G 5/02* (2013.01); *A61G 5/10* (2013.01); *G06Q 50/30* (2013.01);
(Continued)

(58) Field of Classification Search
CPC ........ G06Q 10/02; G06Q 50/30; G06Q 10/00; G06Q 20/00; G06Q 20/123;
(Continued)

(56) References Cited

U.S. PATENT DOCUMENTS 8,565,789 B2    10/2013    Staffaroni et al.
9,488,494 B2    11/2016    Millspaugh
(Continued)

FOREIGN PATENT DOCUMENTS

KR    20160093205 A    8/2016
WO    2011014076 A1    2/2011

OTHER PUBLICATIONS

Zhang, Jianfei, Jingchuan Wang, and Weidong Chen. "A control system of driver assistance and human following for smart wheelchair." 2014 IEEE International Conference on Robotics and Biomimetics (ROBIO 2014). IEEE, 2014. (Year: 2014).*

(Continued)

*Primary Examiner* — Sharad Rampuria
(74) *Attorney, Agent, or Firm* — Brandon Hicks; Bejin Bieneman PLC

(57) ABSTRACT

A method includes transmitting a ride-share request to a ride-share server, the ride-share request including information about an accessibility device, determining a present orientation of the accessibility device, and transmitting the present orientation of the accessibility device to the ride-share vehicle. Another method includes transmitting a present orientation of an accessibility device, receiving a target orientation of the accessibility device, illuminating a light (Continued)

projector, determining that the accessibility device is in the target orientation, and turning off the light projector.

21 Claims, 6 Drawing Sheets

(51) Int. Cl.
*H04W 12/50* (2021.01)
*A61G 5/02* (2006.01)
*A61G 5/10* (2006.01)
*G06Q 50/30* (2012.01)
*H04W 4/02* (2018.01)

(52) U.S. Cl.
CPC ............. *H04W 4/026* (2013.01); *H04W 4/40* (2018.02); *H04W 12/50* (2021.01); *A61G 2203/44* (2013.01)

(58) Field of Classification Search
CPC .. G06Q 20/1235; G06Q 20/382; G06Q 30/00; G06Q 30/018; G06Q 30/0185; G06Q 30/0225; G06Q 30/0248; G06Q 30/06; G06Q 30/0609; G06Q 30/0613; G06Q 30/0615; A61G 5/02; A61G 5/10; A61G 2203/44; H04W 4/026; H04W 4/40; H04W 12/50

See application file for complete search history.

(56) References Cited

U.S. PATENT DOCUMENTS

| | | | |
|---|---|---|---|
| 11,194,399 B2* | 12/2021 | Li | H04W 4/40 |
| 2009/0012666 A1 | 1/2009 | Simpson et al. | |
| 2010/0125415 A1* | 5/2010 | Yamamura | B60Q 9/008 |
| | | | 701/300 |
| 2012/0041675 A1 | 2/2012 | Juliver et al. | |
| 2012/0078671 A1 | 3/2012 | Mohebbi et al. | |
| 2012/0078672 A1* | 3/2012 | Mohebbi | G06Q 10/08 |
| | | | 701/527 |
| 2015/0353000 A1 | 12/2015 | Kowatzki | |
| 2016/0019473 A1 | 1/2016 | Yadidi | |
| 2020/0317116 A1* | 10/2020 | Rakshit | G08G 1/166 |

OTHER PUBLICATIONS

Wang, Zhangjing, Yu Wu, and Qingqing Niu. "Multi-sensor fusion in automated driving: A survey." Ieee Access 8 (2019): 2847-2868 (Year: 2019).*

International Search Report of the International Searching Authority for PCT/US2017/044590 dated Oct. 23, 2017.

* cited by examiner

RIDE-SHARE ACCESSIBILITY

BACKGROUND

Ride-share services allow users to request a ride via a mobile application. A server servicing the mobile application transmits a message, to a nearby driver, with the pickup location of the person requesting the service and the requested destination. The driver proceeds to the pickup location and drives the person requesting the service to the requested destination.

DETAILED DESCRIPTION

Figure 1:
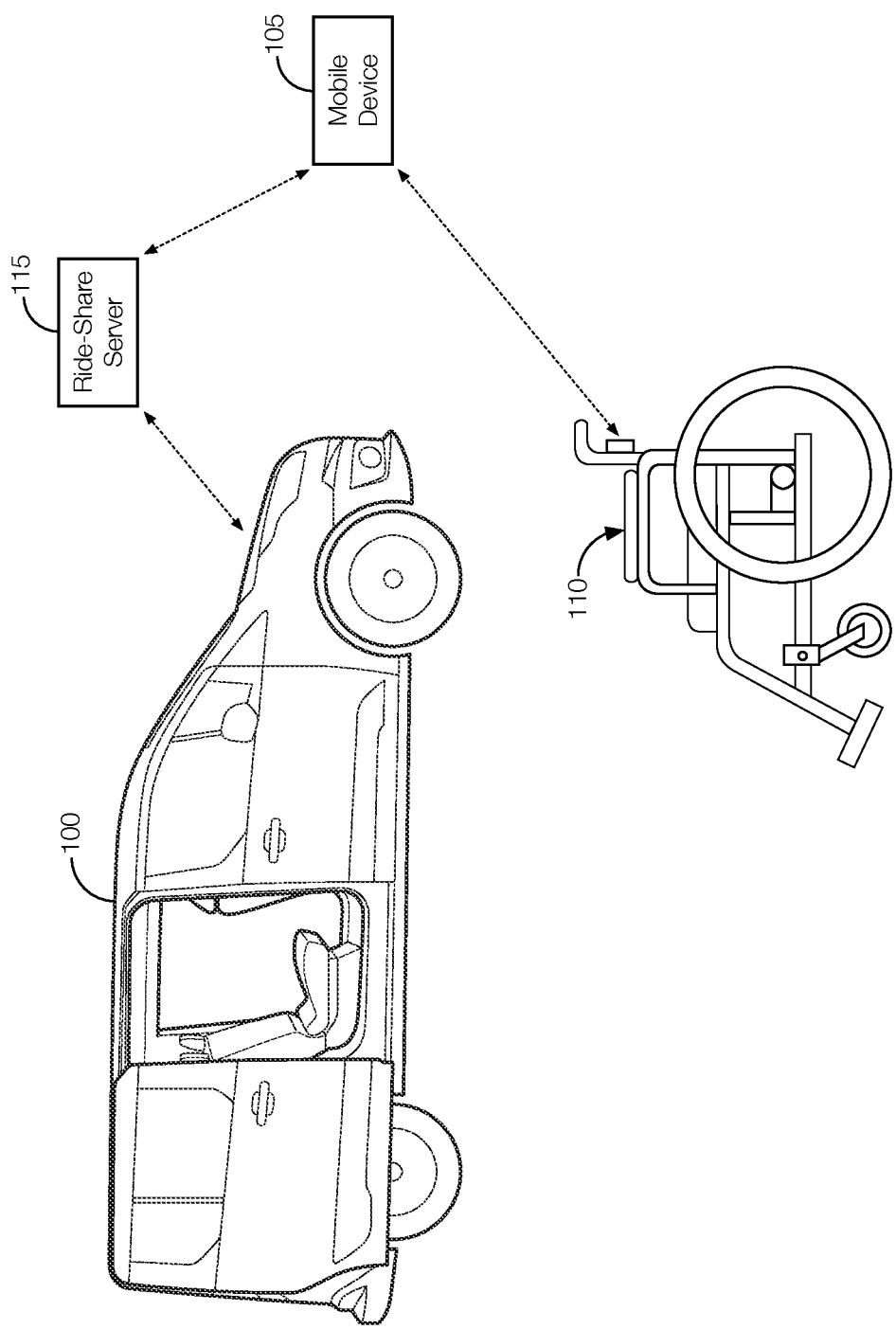
FIG. 1 illustrates an example ride-share vehicle in communication with an example mobile device and an example accessibility device via an example ride-share server.

Not all vehicles are suitable for all ride-share passengers. For example, a large group of people requesting a ride will be uncomfortable in a compact car. A family with small children will need to travel in a vehicle with room for car seats and space for stowing, e.g., a stroller. A person needing a wheelchair will need a vehicle accessible by wheelchair and with space for stowing the wheelchair during the commute.

One solution includes a method, executed via a mobile device or another type of computer, that allows a user to request a ride-share vehicle that will accommodate the wheelchair, referred to below as an accessibility device. The method may include transmitting a ride-share request to a ride-share server. The ride-share request may include information about the accessibility device. The method may further include determining a present orientation of the accessibility device and transmitting the present orientation of the accessibility device to the ride-share vehicle. The information about the accessibility device may include a physical characteristic of the accessibility device. The physical characteristic may include at least one of a physical dimension and a weight of the accessibility device. The ride-share request may indicate whether a user of the accessibility device needs to use the accessibility device when riding in a ride-share vehicle. The method may further include pairing the mobile device with the accessibility device. The method may further include receiving a target orientation from the ride-share vehicle. In this case, the method may include transmitting the target orientation to the accessibility device. In some instances, determining the present orientation of the accessibility device may include receiving the present orientation of the accessibility device from the accessibility device. In some example implementations, the method may include detecting that the ride-share vehicle is near the accessibility device. In that instance, determining the present orientation of the accessibility device and transmitting the present orientation of the accessibility device to the ride-share vehicle may occur after detecting that the ride-share vehicle is near the accessibility device.

Another possible method may be implemented by the accessibility device. The method executed by the accessibility device may include transmitting a present orientation of the accessibility device, receiving a target orientation of the accessibility device, illuminating a light projector, determining that the accessibility device is in the target orientation, and turning off the light projector. The target orientation may be received from one of a mobile device and a ride-share vehicle. The present orientation of the accessibility device may be transmitted to a ride-share vehicle. The method may further include rotating the accessibility device until the accessibility device is in the target orientation. In some example approaches, illuminating the light projector may include shining a first light and a second light. In that example, the method may further include rotating the accessibility device until the first light and the second light overlap. The method may include determining that a ride-share vehicle is near the accessibility device. In that instance, transmitting the present orientation of the accessibility device and receiving the target orientation occur after determining that the ride-share vehicle is near the accessibility device. In some possible implementations, the method may include transmitting information about the accessibility device to a mobile device. The information about the accessibility device may include a physical characteristic of the accessibility device. The physical characteristic may include at least one of a physical dimension and a weight of the accessibility device.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the ride-share vehicle 100 is in communication with a mobile device 105 and an accessibility device 110 via a ride-share server 115.

The ride-share vehicle 100 may be any passenger or commercial automobile such as a car, a truck, a sport utility vehicle, a crossover vehicle, a van, a minivan, a taxi, a bus, etc. In some possible approaches, the ride-share vehicle 100 is an autonomous vehicle that can operate in an autonomous (e.g., driverless) mode, a partially autonomous mode, and/or a non-autonomous mode.

The mobile device 105 may be any portable computer, such as a mobile phone, tablet computer, laptop computer, smartwatch, etc., carried by a user. The mobile device 105 may include circuits and chips that allow the mobile device 105 to execute computer code. The mobile device 105 may further include an antenna, circuits, and chips that facilitate wireless communication with the ride-share vehicle 100, via the ride-share server 115, and with the accessibility device 110. The mobile device 105 may include a user interface (e.g., a touchscreen, keyboard, keypad, etc.) for receiving a user input that requests a ride share. The request may indicate whether the user needs to stay in the accessibility device 110 during the trip or if the user is able to move to one of the vehicle seats. Such information may be provided by the user to the mobile device 105 via the user interface. The mobile device 105 may transmit the request for the ride share to the ride-share server 115. Moreover, as discussed in greater detail below, the mobile device 105 may retrieve information from the accessibility device 110 and send that information with the ride share request. The mobile device 105 may further transmit commands, received from the ride-share server 115, the ride-share vehicle 100, or both, to the accessibility device 110. The mobile device 105 may further include sensors that a programmed to detect the movement of the mobile device 105.

The accessibility device 110 may be a wheelchair, a leg caddy, a rolling walker, a rollator, etc. The accessibility device 110 may be manually operated or motorized. The accessibility device 110 includes electronic components (see FIG. 2) that allow the accessibility device 110 to communicate with the mobile device 105. Thus, the accessibility device 110 can indirectly communicate with the ride-share vehicle 100. In some instances, the accessibility device 110 can receive instructions from the ride-share vehicle 100. The instructions may help the user navigate the accessibility device 110 to a pickup location, orient the accessibility device 110 to facilitate boarding the ride-share vehicle 100, etc. In instances where the accessibility device 110 is motorized, the instructions may cause the accessibility device 110 to automatically navigate to the pickup location and orient relative to the ride-share vehicle 100.

Figure 2:
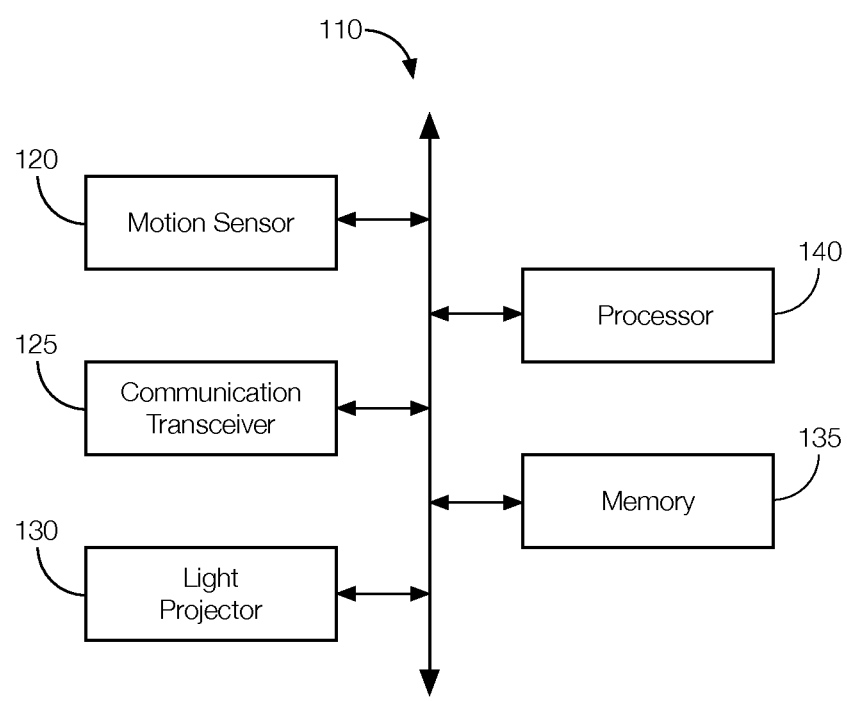
FIG. 2 is a block diagram of example electronic components of the accessibility device in communication with the mobile device.

Referring now to FIG. 2, electronic components of the accessibility device 110 may include a motion sensor 120, a communication transceiver 125, a light projector 130, a memory 135, and a processor 140.

The motion sensor 120 implemented via circuits, chips, or other electronic components that detect movement of the accessibility device 110. For instance, the motion sensor 120 may include an accelerometer, gyroscope, magnetometer, or the like. The motion sensor 120 may output signals representing the movement of the accessibility device 110. The movement represented by the signals output by the motion sensor 120 may include whether the accessibility device 110 is moving forward or backward, moving laterally, turning, traveling on an uneven surface, traveling on a bumpy surface, or the like. The signals may alternatively or additional indicate the speed of the accessibility device 110. In some instances, the motion sensor 120 may determine the present orientation of the accessibility device 110. The present orientation may represent the heading of the accessibility device 110 relative to a fixed location (e.g., magnetic north). The motion sensor 120 may output the present orientation to the memory 135, the processor 140, or both. In some instances, the motion sensor 120 may include a location sensor, such as a Global Positioning System (GPS) sensor that can triangulate the location of the accessibility device 110 by communicating with a series of satellites in the Earth's orbit. In this instance, the motion sensor 120 may output the location of the accessibility device 110 to the memory 135, the processor 140, or both. In some possible approaches, the accessibility device 110 may include multiple motion sensors 120. If the accessibility device 110 has multiple motion sensors 120, not all motion sensors 120 need be of the same type. Thus, the accessibility device 110 may include any one or more of a location sensor, an accelerometer, a gyroscope, and a magnetometer.

The communication transceiver 125 is implemented via an antenna, circuits, chips, or other electronic components that facilitate wireless communication between the accessibility device 110 and the mobile device 105, the ride-share server 115, the ride-share vehicle 100, or a combination thereof. For instance, the communication transceiver 125 may receive, from the mobile device 105, a request for information about the accessibility device 110. It may further receive commands from the mobile device 105. The commands may include instructions for boarding the ride-share vehicle 100. In some possible implementations, the communication transceiver 125 may broadcast the signals generated by the motion sensor 120 so, e.g., the mobile device 105 may determine whether the motion of the accessibility device 110 is similar to that of the mobile device 105. If so, the mobile device 105 may determine that the user of the mobile device 105 is also using the accessibility device 110. The communication transceiver 125 may be programmed to communicate in accordance with any number of wired or wireless communication protocols. For instance, the communication transceiver 125 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc.

The light projector 130 is implemented via one or more light sources, such as one or more light emitting diodes, light bulbs, or the like. The light projector 130 illuminates upon a command from, e.g., the processor 140. The light projector 130 may shine a first light 145 indicating a target orientation of the accessibility device 110 and a second light 150 indicating a present orientation of the accessibility device 110. The first light 145 may shine at a location on the ground near the accessibility device 110, as shown in FIG. 3C, indicating how far the accessibility device 110 needs to rotate to be in the target orientation. Also shown in FIG. 3C, the second light 150 may shine on the ground but may be fixed relative to the accessibility device 110. Thus, the second light 150 may approach the location of the first light 145 as the accessibility device 110 is rotated about a fixed axis. When the first light 145 and second light 150 are aligned (see FIG. 3D), the accessibility device 110 may be in the target orientation. The light projector 130 may shine the first light 145 and the second light 150 based on commands received from the processor 140, as discussed in greater detail below.

The memory 135 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 135 may store instructions executable by the processor 140 and data such as information about the accessibility device 110. The information about the accessibility device 110 may include the type of accessibility device 110 (wheelchair, leg caddy, rolling walker, rollator, etc.), the model, a unique identifier such as a serial number, physical characteristics such as the physical dimensions (length, width, height, etc.) and weight of the accessibility device 110, the present orientation, the target orientation received from the ride-share vehicle 100, information about the user, or other information that the accessibility device 110 or the mobile device 105 may transmit to the ride-share server 115, the ride-share vehicle 100, or both, to facilitate a ride share that accommodates the user of the accessibility device 110. The instructions and data stored in the memory 135 may be accessible to the processor 140 and possibly other components of the accessibility device 110, the mobile device 105, the ride-share vehicle 100, or a combination thereof.

The processor 140 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 140 may be programmed to pair with the mobile device 105. Pairing with the mobile device 105 may include the processor 140 commanding the communication transceiver 125 to establish communication with the mobile device 105 and periodically exchange information with the mobile device 105. The information exchanged may include the information about the accessibility device 110 stored in the memory 135, or the signals captured by the motion sensor 120. The processor 140, the mobile device 105, or both, may compare the signals captured by the motion sensor 120 to the motion captured by the sensors of the mobile device 105 to confirm that the person carrying the mobile device 105 is also using the accessibility device 110. Thus, in instances where multiple mobile devices 105 and multiple accessibility devices 110 are nearby, the processor 140, the mobile device 105, or both, may determine which accessibility device 110 and which mobile device 105 are presently in use by the user, especially if the user owns multiple accessibility devices 110 and multiple mobile devices 105 or if the user is, e.g., renting or borrowing an accessibility device 110, in which case the user may not know much information about the accessibility device 110.

Upon receipt of a command from the mobile device 105, the processor 140 may command the communication transceiver 125 to transmit, to the mobile device 105, the information stored in the memory 135 about the accessibility device 110. The mobile device 105 may incorporate that information into the request to the ride-share server 115.

When the ride-share vehicle 100 is nearby, the processor 140 may further command the mobile device 105 to transmit the present orientation of the accessibility device 110 to the ride-share vehicle 100. The ride-share vehicle 100 may respond with a target orientation of the accessibility device 110. The target orientation may represent an orientation of the accessibility device 110, relative to, e.g., the street, that would be best for boarding the ride-share vehicle 100. In some instances, the target orientation would have the accessibility device 110 face (e.g., perpendicular to) the street. The ride-share vehicle 100 may determine the target orientation relative to the heading of the ride-share vehicle. For instance, the ride-share vehicle may determine the target orientation to be, e.g., perpendicular to the heading of the ride-share vehicle 100, especially if the accessibility device 110, the user, or both, are going to board the ride-share vehicle 100 from the side.

The processor 140 may be further programmed to respond to commands from the ride-share vehicle 100. For instance, the ride-share vehicle 100 may recommend how to orient the accessibility device 110 to make boarding the ride-share vehicle 100 easier. The command may include an instruction for orienting the accessibility device 110 relative to the street according to, e.g., the target orientation. In one possible approach, the processor 140 may be programmed to command the light source to shine the first light 145 at the location identified by the ride-share vehicle 100. The location identified by the ride-share vehicle 100 may correspond to the heading of the accessibility device 110 when in the target orientation. The processor 140 may be further programmed to command the second light 150 to illuminate. The user, using the first light 145 and second light 150 as guides, may manually rotate the accessibility device 110 until the second light 150 overlaps the first light 145. When the second light 150 overlaps the first light 145, the accessibility device 110 may be in the target orientation for boarding the ride-share vehicle 100.

In instances where the accessibility device 110 is powered, the processor 140 may output signals to, e.g., an electric motor that cause the accessibility device 110 to rotate until the second light 150 overlaps the first light 145. The processor 140 may determine that the second light 150 overlaps the first light 145 based on camera images, feedback from the user (i.e., the processor 140 commands the accessibility device 110 to rotate clockwise or counterclockwise until the user presses a button indicating that the accessibility device 110 should stop), or the like. In another possible approach, the processor 140 may command the motor to rotate the accessibility device 110 until the present orientation, as measured by the motion sensor 120, is the target orientation. With this approach, the accessibility device 110 may omit the light source, cameras, etc.

Messages, including commands, from the ride-share vehicle 100 may be received, from the ride-share vehicle 100, at the processor 140 via the communication transceiver 125. In some instances, the communication transceiver 125 receives messages directly from the ride-share vehicle 100. In other possible implementations, the mobile device 105 receives the messages from the ride-share vehicle 100 directly or via the ride-share server 115, and the communication transceiver 125 receives messages from the mobile device 105.

Figure 3A:
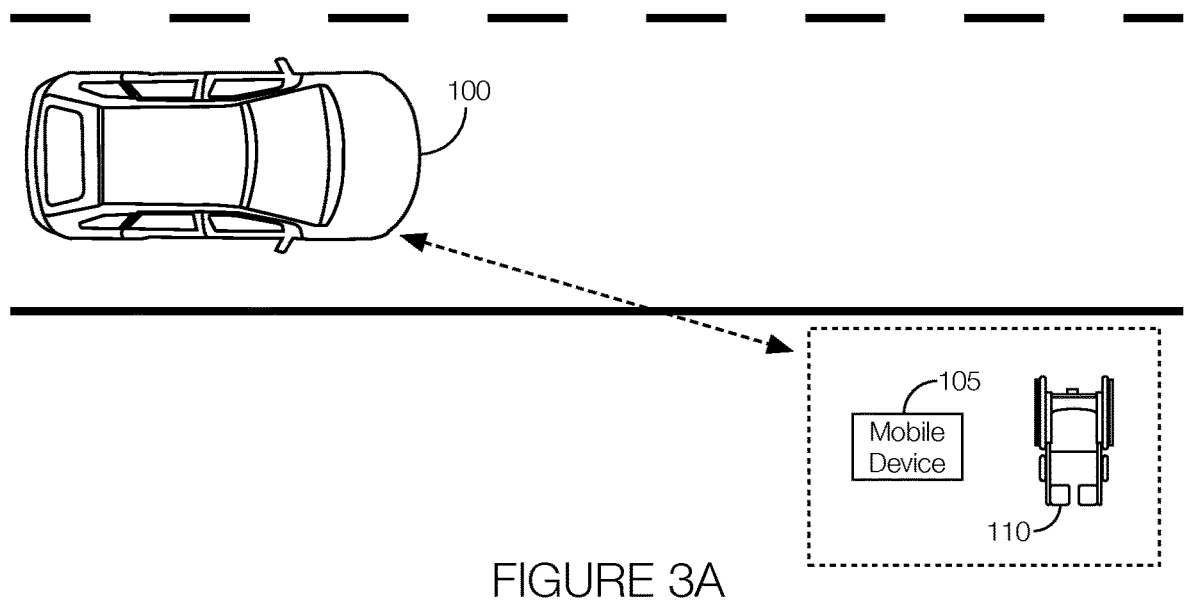
FIGS. 3A-3D illustrate the ride-share vehicle approaching the accessibility device and the accessibility device adjusting its orientation to facilitate boarding the ride-share vehicle.
Figure 3B:
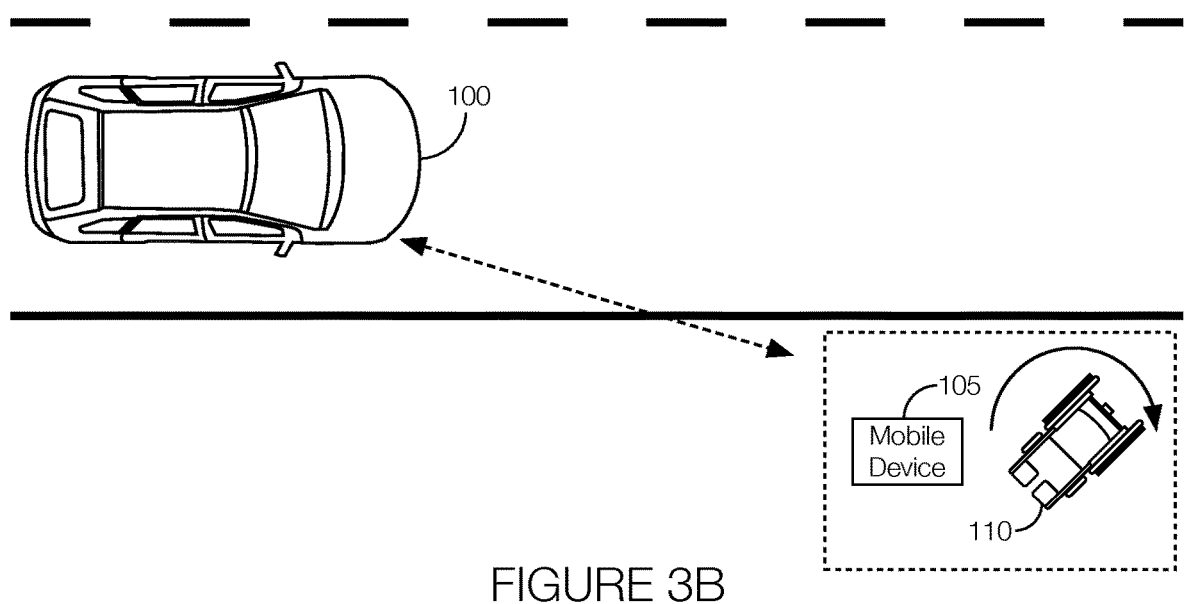
Figure 3C:
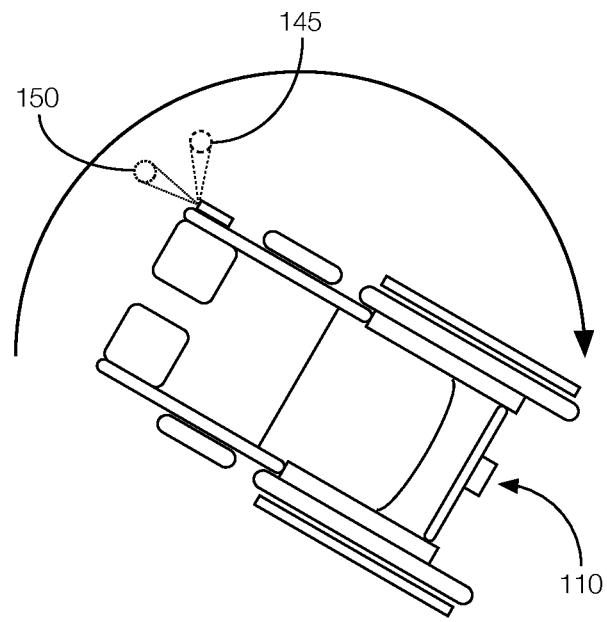
Figure 3D:
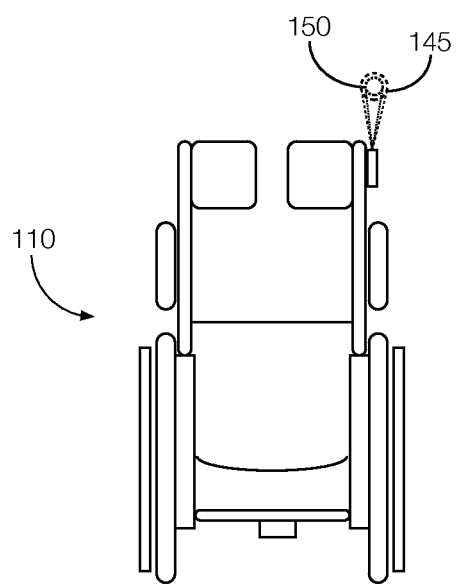

FIGS. 3A-3D illustrate an example scenario where the ride-share vehicle 100 helps facilitate boarding as the ride-share vehicle 100 approaches the accessibility device 110. In FIG. 3A, the ride-share vehicle 100 is approaching the pick-up location where the user of the accessibility device 110 will board the ride-share vehicle 100. As shown, the accessibility device 110 is facing away from the street. Prior to the ride-share vehicle 100 arriving at the pick-up location, the ride-share vehicle 100 exchanges information with the accessibility device 110. The information may be exchanged directly between the accessibility device 110 and the ride-share vehicle 100 or via intermediary devices such as the mobile device 105, the ride-share server 115, or both. The information exchanged may include the location of the accessibility device 110, the orientation of the accessibility device 110, or any other information output by one or more of the motion sensors 120. Some information, such as the type and size of the accessibility device 110, may have been exchanged prior to the ride-share vehicle 100 being so close to the pick-up location. As the ride-share vehicle 100 approaches the accessibility device 110, the ride-share vehicle 100 may determine, from the output of the motion sensors 120, that the accessibility device 110 is not oriented for easily boarding the ride-share vehicle 100. The ride-share vehicle 100 may respond by transmitting a signal with a target orientation, as shown in FIG. 3B. The accessibility device 110 responds to the signal by commanding the accessibility device 110 to rotate to the target orientation or by helping the user manually rotate the accessibility device 110 to the target orientation via the light source and shown in FIG. 3C. For example, as shown in FIG. 3C, the light source may illuminate the first light 145 and the second light 150. In instances where the accessibility device 110 is powered, the electric engine may cause the accessibility device 110 to rotate until the second light 150 overlaps the first light 145. The overlap may be detected based on camera images, feedback from the user (i.e., the user presses a button indicating that the accessibility device 110 should stop rotating), or the like. In another possible approach, the motor may continue to rotate the accessibility device 110 until the present orientation, as measured by the motion sensor 120, is the same as the target orientation. With this approach, the accessibility device 110 may omit the light source, cameras, etc. In the example of FIG. 3C, the target orientation would have the accessibility device 110 face the street, making it easier for the user to enter the ride-share vehicle 100. The present orientation of the accessibility device 110 is at a skewed angle relative to the street, which is indicated by the first light 145 and the second light 150 not overlapping. Rotating the accessibility device 110 until the first light 145 overlaps the second light 150 would place the accessibility device 110 at the target orientation. FIG. 3D shows the accessibility device 110 in the target orientation after rotating the accessibility device 110 so the first light 145 and second light 150 are overlapping.

Figure 4:
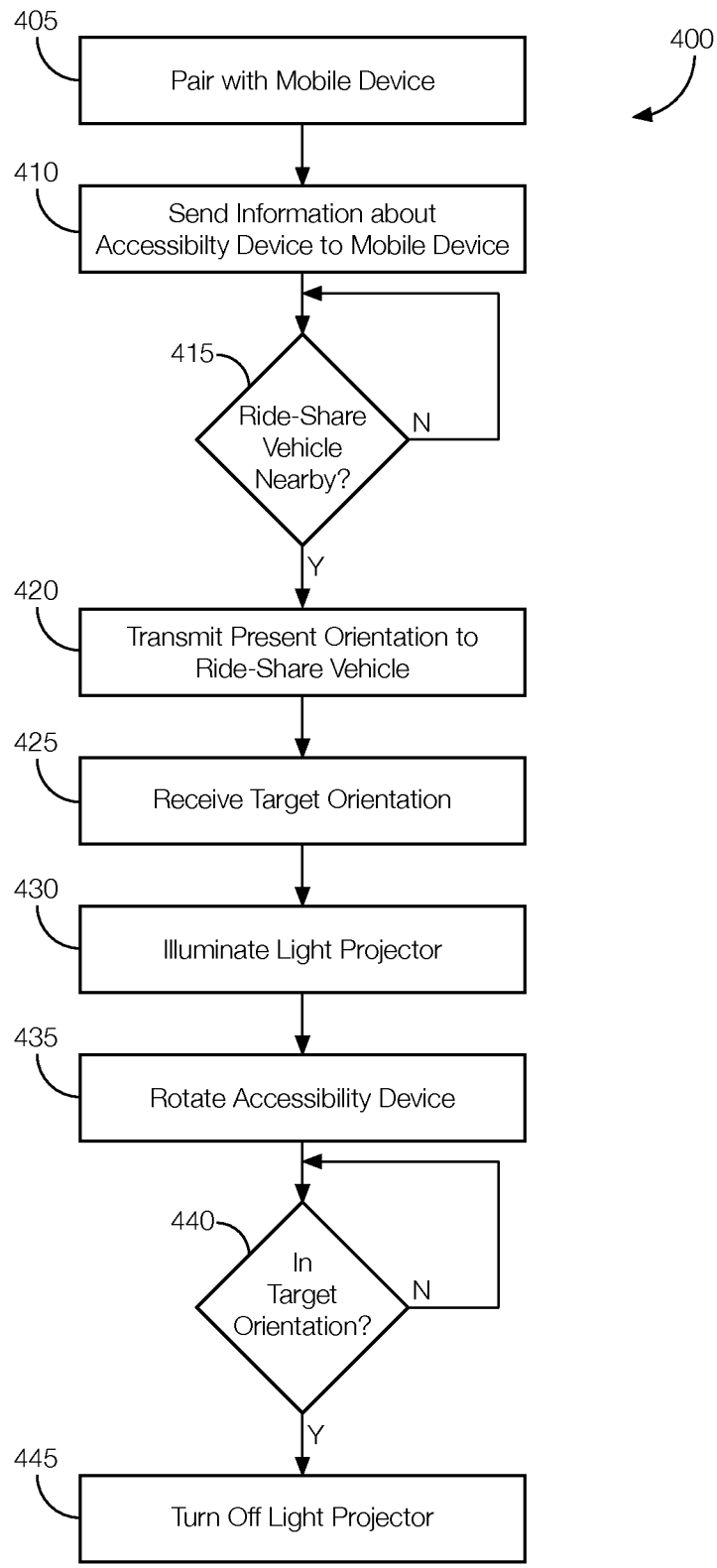
FIG. 4 is a flowchart of an example process that may be executed by one or more components of the accessibility device.

FIG. 4 is a flowchart of an example process 400 that may be executed by the accessibility device 110. The process 400 may begin at any time, such as prior to the user of the accessibility device 110 preparing to board a ride-share vehicle 100.

At block 405, the accessibility device 110 pairs with the mobile device 105. For instance, the processor 140 commands the communication transceiver 125 to establish wireless communication with the mobile device 105. The communication transceiver 125 may establish communication with the mobile device 105 via a short-range telecommunication protocol such as Bluetooth® or Bluetooth® Low Energy.

At block 410, the accessibility device 110 sends information about the accessibility device 110 to the mobile device 105. The information about the accessibility device 110 may include the type of accessibility device 110 (wheelchair, leg caddy, rolling walker, rollator, etc.), the model, a unique identifier such as a serial number, physical characteristics such as the physical dimensions and weight of the accessibility device 110, the present orientation, the target orientation received from the ride-share vehicle 100, information about the user, or other information that the accessibility device 110 or the mobile device 105 may transmit to the ride-share server 115, the ride-share vehicle 100, or both, to facilitate a ride share that accommodates the user of the accessibility device 110. The processor 140 may access the information from the memory 135 and communication the communication transceiver 125 to transmit the information to the ride-share vehicle 100 either directly or via the mobile device 105.

At decision block 415, the accessibility device 110 determines if the ride-share vehicle 100 is nearby. The processor 140 may determine that the ride-share vehicle 100 is nearby based on location signals transmitted from the ride-share vehicle 100 to the accessibility device 110, either directly or via the ride-share server 115, the mobile device 105, or both. The processor 140 may be programmed to compare the location of the ride-share vehicle 100 to the location of the accessibility device 110. When the ride-share vehicle 100 is within a predetermined distance (e.g., within a quarter of a mile, a tenth of a mile, etc.), the processor 140 may determine that the ride-share vehicle 100 is nearby. Upon determining that the ride-share vehicle 100 is nearby, the process 400 may proceed to block 420. Otherwise, block 415 may continue to execute until the ride-share vehicle 100 is nearby.

At block 420, the accessibility device 110 transmits its present orientation to the ride-share vehicle 100. The present orientation may represent the heading of the accessibility device 110 relative to a fixed location (e.g., magnetic north). The motion sensor 120 may output the present orientation to the memory 135, the processor 140, or both, and the processor 140 may command the communication transceiver 125 to transmit the present orientation to the ride-share vehicle 100 either directly or via the mobile device 105, the ride-share server 115, or both.

At block 425, the accessibility device 110 receives the target orientation from the ride-share vehicle 100. The target orientation may represent an orientation of the accessibility device 110, relative to, e.g., the street, that would be best for boarding the ride-share vehicle 100. The communication transceiver 125 may receive the target orientation from the ride-share vehicle 100, the mobile device 105, or the ride-share server 115. The target orientation may be transmitted from the communication transceiver 125 to the processor 140, the memory 135, or both.

At block 430, the accessibility device 110 may illuminate the light source. The processor 140 may command the light source to shine the first light 145 at the location identified by the ride-share vehicle 100. The location identified by the ride-share vehicle 100 may correspond to the heading of the accessibility device 110 when in the target orientation. The processor 140 may further command the second light 150 to illuminate.

At block 435, the accessibility device 110 may be rotated. The accessibility device 110 may be rotated manually by the user, or the processor 140 may command an electric motor to rotate the accessibility device 110. The user can manually rotate the accessibility device 110 until the second light 150 overlaps the first light 145. When the second light 150 overlaps the first light 145, the accessibility device 110 may be in the target orientation for boarding the ride-share vehicle 100. In instances where the accessibility device 110 is powered, the processor 140 may output signals to, e.g., the electric motor that cause the accessibility device 110 to rotate until the second light 150 overlaps the first light 145. The processor 140 may determine that the second light 150 overlaps the first light 145 based on camera images, feedback from the user (i.e., the processor 140 commands the accessibility device 110 to rotate clockwise or counterclockwise until the user presses a button indicating that the accessibility device 110 should stop), or the like. In another possible approach, the processor 140 may command the motor to rotate the accessibility device 110 until the present orientation, as measured by the motion sensor 120, is the target orientation. With this approach, the accessibility device 110 may omit the light source, cameras, etc.

At decision block 440, the accessibility device 110 determines if the accessibility device 110 is in the target orientation. As explained above, the processor 140 may determine that the accessibility device 110 is in the target orientation based on feedback from the user (e.g., a user input), by comparing camera images of the first light 145 and second light 150, based on data collected by the motion sensor 120, etc. When the accessibility device 110 is in the target orientation, the process 400 may proceed to block 445. Otherwise, block 440 may repeat until the accessibility device 110 is in the target orientation.

At block 445, the accessibility device 110 may turn off the light projector 130. The processor 140 may be programmed to turn off the light projector 130 may sending a control signal to the light projector 130. The control signal may cause the light projector 130 to stop projecting both the first light 145 and second light 150.

Figure 5:
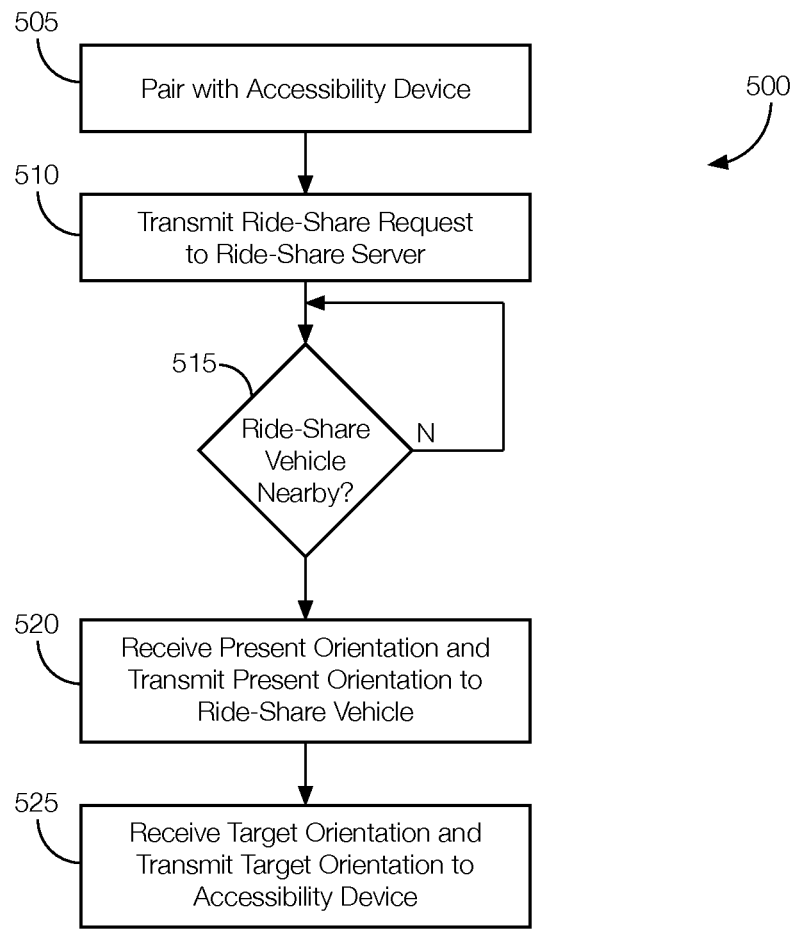
FIG. 5 is a flowchart of an example process that may be executed by one or more components of the mobile device.

FIG. 5 is a flowchart of an example process 500 that may be executed by the mobile device 105. The process 500 may begin at any time, such as prior to the user of the accessibility device 110 requesting a ride-share vehicle 100.

At block 505, the mobile device 105 pairs with the accessibility device 110. For instance, the mobile device 105 may establish wireless communication with the communication transceiver 125 of the accessibility device 110 via a short-range telecommunication protocol such as Bluetooth® or Bluetooth® Low Energy.

At block 510, the mobile device 105 transmits a ride-share request to the ride-share server 115. Transmitting the ride-share request may include the mobile device 105 wirelessly communicating with the ride-share server 115. The ride-share request may identify a pick-up location, a requested destination, and the user's accessibility needs. For instance, the ride-share request may indicate whether the user needs to stay in the accessibility device 110 during the trip or if the user is able to move to one of the vehicle seats. Such information may be provided by the user to the mobile device 105 via the user interface. Moreover, the mobile device 105 may retrieve information about the accessibility device 110, from the accessibility device 110, and send that information to the ride-share server 115 with the ride share request.

At decision block 515, the mobile device 105 determines if the ride-share vehicle 100 is nearby. The mobile device 105 may determine that the ride-share vehicle 100 is nearby based on location signals transmitted from the ride-share vehicle 100 to the ride-share server 115, directly to the mobile device 105, or both. The mobile device 105 may be programmed to compare the location of the ride-share vehicle 100 to the location of the mobile device 105. When the ride-share vehicle 100 is within a predetermined distance (e.g., within a quarter of a mile, a tenth of a mile, etc.), the mobile device 105 may determine that the ride-share vehicle 100 is nearby. Upon determining that the ride-share vehicle 100 is nearby, the process 500 may proceed to block 520. Otherwise, block 515 may continue to execute until the ride-share vehicle 100 is nearby.

At block 520, the mobile device 105 receives the present orientation of the accessibility device 110 and transmits the present orientation to the ride-share vehicle 100. The mobile device 105 may determine the present orientation of the accessibility device 110 based on communications with the accessibility device 110. That is, the communication transceiver 125 of the accessibility device 110 may transmit the present orientation to the mobile device 105. The present orientation, as explained above, may be determined from the motion sensors 120 of the accessibility device 110. The mobile device 105 may wirelessly transmit the present orientation to the ride-share vehicle 100 either directly or via the ride-share server 115.

At block 525, the mobile device 105 receives the target orientation from the ride-share vehicle 100 and transmits the target orientation to the accessibility device 110. As previously explained, the target orientation may represent an orientation of the accessibility device 110, relative to, e.g., the street, that would be best for boarding the ride-share vehicle 100. The mobile device 105 may wirelessly transmit the target orientation to the accessibility device 110.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   transmitting a present orientation of an accessibility device including a present angle of the accessibility device relative to the orientation of a vehicle, wherein the accessibility device includes electronic components including a component to allow communication with at least one other device and a component to determine the present orientation;
   receiving a target orientation of the accessibility device including a target angle of the accessibility device relative to the orientation of a vehicle;
   illuminating a light projector;
   determining that the accessibility device is in the target orientation; and
   turning off the light projector.

2. The method of claim 1, wherein the target orientation is received from one of a mobile device and a ride-share vehicle.

3. The method of claim 1, wherein the present orientation of the accessibility device is transmitted to a ride-share vehicle.

4. The method of claim 1, further comprising rotating the accessibility device until the accessibility device is in the target orientation.

5. The method of claim 1, wherein illuminating the light projector includes shining a first light and a second light.

6. The method of claim 5, further comprising rotating the accessibility device until the first light and the second light overlap.

7. The method of claim 1, further comprising determining that a ride-share vehicle is near the accessibility device.

8. The method of claim 7, wherein transmitting the present orientation of the accessibility device and receiving the target orientation occur after determining that the ride-share vehicle is near the accessibility device.

9. The method of claim 1, further comprising transmitting information about the accessibility device to a mobile device.

10. The method of claim 9, wherein the information about the accessibility device includes a physical characteristic of the accessibility device.

11. The accessibility device of claim 1, wherein the present orientation of the accessibility device is transmitted to a ride-share vehicle.

12. The accessibility device of claim 1, further comprising rotating the accessibility device until the accessibility device is in the target orientation.

13. The accessibility device of claim 1, wherein illuminating the light projector includes shining a first light and a second light.

14. The accessibility device of claim 13, further comprising rotating the accessibility device until the first light and the second light overlap.

15. The accessibility device of claim 1, further comprising determining that a ride-share vehicle is near the accessibility device.

16. The accessibility device of claim 15, wherein transmitting the present orientation of the accessibility device and receiving the target orientation occur after determining that the ride-share vehicle is near the accessibility device.

17. The accessibility device of claim 1, further comprising transmitting information about the accessibility device to a mobile device.

18. The accessibility device of claim 17, wherein the information about the accessibility device includes a physical characteristic of the accessibility device.

19. The accessibility device of claim 18, wherein the physical characteristic includes at least one of a physical dimension and a weight of the accessibility device.

20. An accessibility device comprising a processor and a memory, the memory storing instructions executable by the processor, including instructions to:
   transmit a present orientation of the accessibility device including a present angle of the accessibility device relative to the orientation of a vehicle, wherein the accessibility device includes electronic components including a component to allow communication with at least one other device and a component to determine the present orientation;

receive a target orientation of the accessibility device including a target angle of the accessibility device relative to the orientation of a vehicle;

illuminate a light projector;

determine that the accessibility device is in the target orientation; and turn off the light projector.

21. The accessibility device of claim 20, wherein the target orientation is received from one of a mobile device and a ride-share vehicle.

* * * * *